United States Patent [19]

Matsumoto et al.

[11] Patent Number: 4,658,920

[45] Date of Patent: * Apr. 21, 1987

[54] COMBINATORIAL WEIGHING AND COMBINATORIAL COUNTING METHOD AND APPARATUS

[75] Inventors: Seishi Matsumoto, Tokyo; Takeo Nakashimizu, Itabashi; Yuji Abe, Tokyo, all of Japan

[73] Assignee: Kabushiki Kaisha Ishida Koki Seisakusho, Kyoto, Japan

[*] Notice: The portion of the term of this patent subsequent to Oct. 29, 2002 has been disclaimed.

[21] Appl. No.: 746,627

[22] Filed: Jun. 19, 1985

Related U.S. Application Data

[63] Continuation of Ser. No. 402,364, Jul. 27, 1982, Pat. No. 4,549,617.

[30] Foreign Application Priority Data

Jul. 28, 1981 [JP] Japan .................. 56-118722

[51] Int. Cl.$^4$ .................. G01G 19/00; G01G 19/22; G01G 19/52
[52] U.S. Cl. .................. 177/25; 177/1; 177/50; 177/70
[58] Field of Search .......... 177/1, 25, 50, 70, DIG. 12

[56] References Cited

U.S. PATENT DOCUMENTS

| | | | |
|---|---|---|---|
| 3,939,928 | 2/1976 | Murakami et al. | 177/25 |
| 4,139,070 | 2/1979 | Hanson et al. | 177/25 |
| 4,398,613 | 8/1983 | Hirano | 177/25 |
| 4,473,126 | 9/1984 | Hirano | 177/25 |
| 4,546,617 | 10/1985 | Matsumoto et al. | 177/25 X |

FOREIGN PATENT DOCUMENTS 2820843 11/1978 Fed. Rep. of Germany.
3247256 7/1983 Fed. Rep. of Germany.
2039374 8/1980 United Kingdom.

OTHER PUBLICATIONS

Instruments & Control Systems, "Interfacing Electronic Scales with a Central Computer", L. A. Tonies, vol. 50, No. 6, Jun. 1977, pp. 49–51.

Primary Examiner—E. A. Goldberg
Assistant Examiner—Patrick W. Foster
Attorney, Agent, or Firm—Staas & Halsey

[57] ABSTRACT

A combinatorial weighing method and apparatus for obtaining a batch of articles of a plurality of categories, each category of articles in the batch having a predetermined weight or made up of a predetermined number of articles. The method includes the steps of setting a target value for each category of articles, and supplying a plurality of weighing machines, groups of which are provided for each category of articles, with the articles of the category corresponding thereto. For each category of articles and from all combinations is selected, of the weighing machines supplied with the category of articles, a best combination whose total value (weight or number) is equal to the target value set for that category or closest to the target value within preset allowable limits. Then, the articles from those weighing machines corresponding to the best combination obtained for each category of articles, is discharged so that a batch composed of the discharged articles, is obtained.

11 Claims, 6 Drawing Figures

COMBINATORIAL WEIGHING AND COMBINATORIAL COUNTING METHOD AND APPARATUS

This is a continuation of copending Application Ser. No. 402,364, filed July 27, 1982 now U.S. Pat. No. 4,549,617. This application is related to U.S. Application Ser. No. 351,959, filed Feb. 24, 1982.

BACKGROUND OF THE INVENTION

This invention relates to a combinatorial weighing and counting method and apparatus. More particularly, the invention relates to a combinatorial weighing and counting method and apparatus which includes steps of setting a target weight or target number for articles belonging to a plurality of different categories (hereafter the target weight and target number will be referred to as the target value where appropriate), and obtaining a batch of the collected articles wherein the total value (weight or number) of the articles classified by category is equal to the target value set for that category, or is closest to the target value within preset allowable limits.

A combinatorial weighing method known in the art includes steps of weighing articles which have been introduced into the weighing hoppers of a plurality of weighing machines, selecting the combination of weighing machines that gives a weight total equal to a target weight or closest to the target weight within preset allowable limits, discharging only the articles held by the hoppers of the selected weighing machines, replenishing the emptied hoppers with articles, finding the next combination, and repeating the foregoing process to permit highly accurate weighing to continue in automatic fashion.

There is also known a combinatorial counting method which includes the steps of weighing articles which have been introduced into the weighing hoppers of a plurality of weighing machines, dividing each weight value by the weight of each article (i.e., the unit weight thereof) to obtain the number of articles introduced into each weighing machine, adding combinations of the article numbers, selecting the combination of weighing machines that gives a total number equal to a target number or closest to the target number within preset allowable limits, discharging only the articles held by the hoppers of the selected weighing machines, replenishing the emptied hoppers with articles, finding the next combination, and repeating the foregoing process to permit highly accurate counting to continue in automatic fashion.

These conventional combinatorial weighing and counting methods are applicable to articles of a single variety only or, at best, to a mixture of different articles where the ratio of the articles in the mixture is predetermined. Accordingly, it has not been possible with the conventional methods to obtain a batch of articles of a plurality of categories wherein each category of articles exhibits a predetermined weight or article number of great accuracy.

SUMMARY OF THE INVENTION

Accordingly, an object of the present invention is to provide a combinatorial weighing and counting method and apparatus suitable for obtaining a batch of articles of a plurality of different categories, with each category of articles in the batch exhibiting a predetermined weight or number of articles.

Another object of the present invention is to provide a combinatorial weighing and counting method and apparatus wherein it is possible to set a target value for each category of articles belonging to a plurality of different categories, and to obtain a batch of the articles, wherein the total weight or total number of the articles of each category in the batch is equal to the target value set for that category, or is closest to the target value within preset allowable limits.

Still another object of the present invention is to provide a combinatorial weighing method and apparatus wherein it is possible to obtain a batch of articles of a plurality of categories, each of which comprises predetermined number of articles set for that category, while the total weight of all of the articles in the batch is that which is closest to a target weight.

A further object of the present invention is to provide a combinatorial weighing apparatus and a method including the steps of setting a target number for each of a plurality of article categories, and obtaining a batch of the articles, wherein the total number of articles of each category in the batch is that which is equal to the target number set for that category, or that which is closest to the target number within preset allowable limits, while the total weight of all the articles in the batch is that which is closest to a target weight. When no combination of articles of a certain article category is found that gives a value equal to the target number or closest to the target number within the preset allowable limits, the target number for each of the articles is revised.

Other features and advantages of the invention will be apparent from the following description taken in conjunction with the accompanying drawings in which like reference characters designate the same or similar parts throughout the figures thereof.

DESCRIPTION OF THE PREFERRED EMBODIMENT

Figure 1:
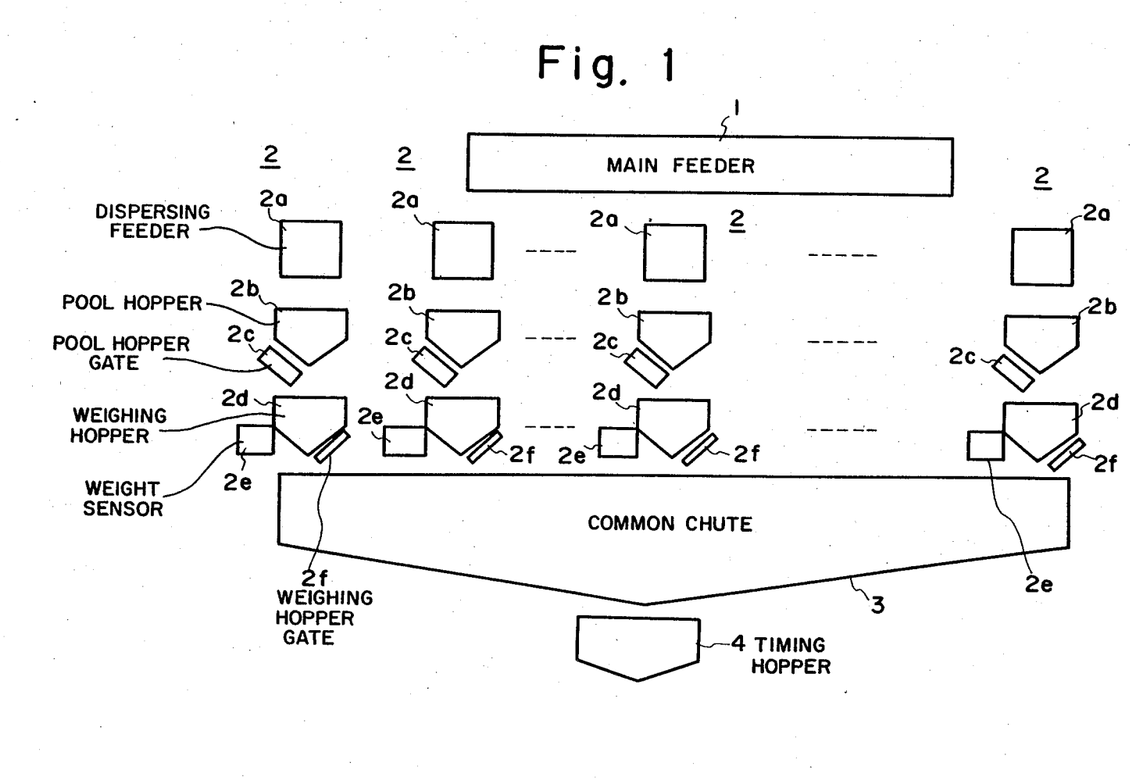
FIG. 1 is a schematic diagram of a conventional combinatorial weighing apparatus and is useful in describing a combinatorial weighing method for articles of a single variety or category.

Referring to FIG. 1 which shows an apparatus for practicing a combinatorial weighing method applied to articles of a single variety, numeral 1 denotes a main feeder of vibratory conveyance type. Articles to be weighed are introduced into the main feeder 1 and imparted with vibratory motion for a predetermined length of time so as to be dispersed radially outward from the center of the main feeder. Numerals 2, 2 . . . denote n-number of weighing stations which are arranged around the main feeder 1 along radially extending lines to receive the articles dispersed by the main feeder. Each weighing station 2 includes a dispersing feeder 2a, a pool hopper 2b, a pool hopper gate 2c, a weighing hopper 2d, a weight sensor 2e, and a weighing hopper gate 2f. The dispersing feeder 2a comprises an independently vibratable conveyance device for feeding the articles by means of vibration, or an independently operable shutter. In either case, eash dispersing feeder 2a is so arranged that the articles received from the centrally located main feeder 1 can be introduced into the corresponding pool hopper 2b disposed therebelow. The pool hopper gate 2c is provided on each pool hopper 2b in such a manner that the articles received in the pool hopper 2b are released into the weighing hopper 2d when the pool hopper gate 2c is opened. Each weighing machine consists of a weighing hopper 2d and weight sensor 2e of its own, the latter being attached to the hopper 2d. The weight sensor 2e is operable to measure the weight of the article introduced into the corresponding weighing hopper, and to apply an electrical signal indicative of the measured weight to a combination control unit, shown in FIG. 2. The combination control unit then selects the combination of weighing machines (known as the "best" combination) that gives a total weight equal to a target value or closest to the target value within preset allowable limits, as will be described below in further detail. Each weighing hopper 2d is provided with its own weighing hopper gate 2f. A drive control unit 17 (FIG. 2), upon receiving the signals from each of the weight sensors 2e produces a signal to open only the weighing hopper gates 2f of those weighing machines that give the best combination. These gates 2f discharge the articles into a common chute 3 where they are collected together. The collecting chute 3 has the shape of a funnel and is so arranged as to receive the articles from any of the circularly arrayed weighing hoppers 2d via the hopper gates 2f, which are located above the funnel substantially along its outer rim. The articles received by the collecting chute 3 at the centrally located lower end thereof by falling under their own weight or by being forcibly shifted along the inclined wall of the funnel by a mechanical scraper or the like (not shown). The collecting chute 3 is provided with a timing hopper 4 at the lower end thereof for temporarily holding the collected articles. The arrival of an externally applied signal from a packaging machine or the like causes the timing hopper 4 to release the retained articles from the system.

Figure 2:
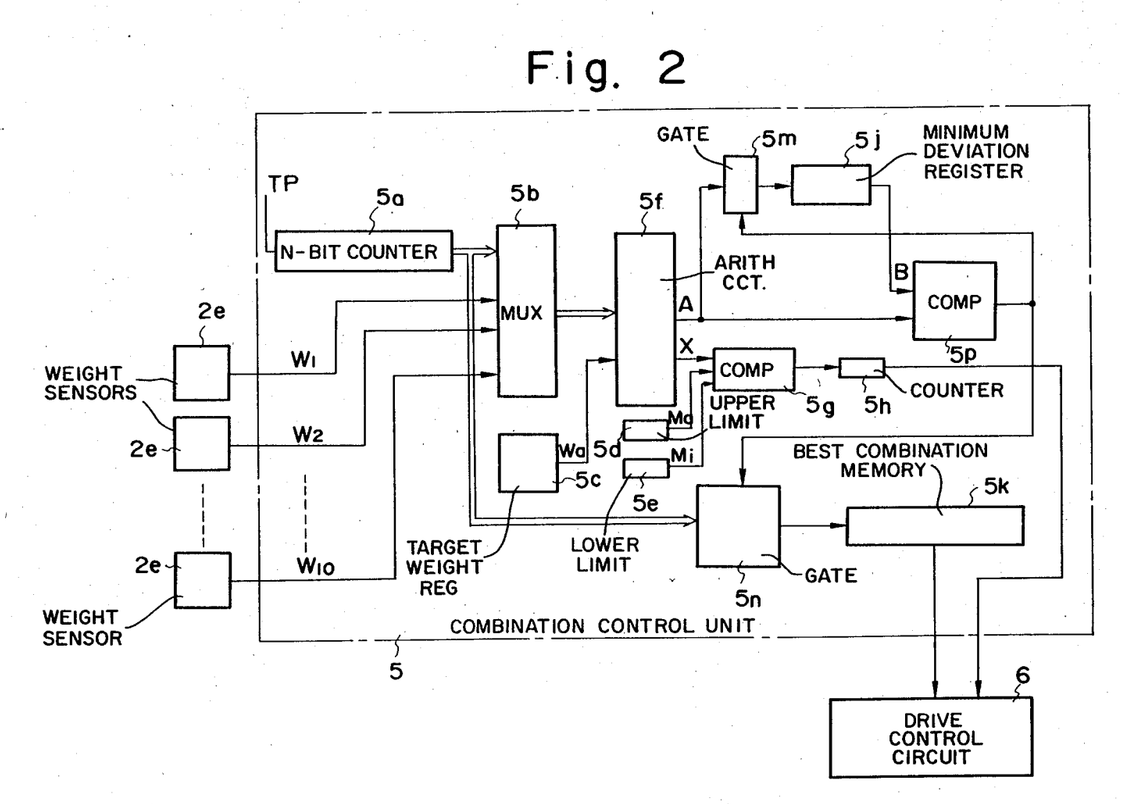
FIG. 2 is a block diagram of a combination control unit of practicing the method described with reference to FIG. 1.

Reference will now be had to FIG. 2 to describe the combination control unit mentioned above. The combination control unit, indicated at numeral 5, includes an n-bit binary counter 5a for counting timing pulses TP of a predetermined period and for generating combinations of the n-number of weighing machines. These combinations will also be referred to as "combination patterns" where appropriate. Specifically, for n-number of weighing hoppers, n combinations are possible when each combination is composed of one weighing hopper from the total of n weighing hoppers, $n(n-1)/2!$ combinations are possible when each combination is composed of two weighing hoppers selected from said total, and, in general, $n(n-1)(n-2)\ldots(n-r+1)/r!$ combinations are possible when each combination is composed of r-number of weighing hoppers selected from said total of n weighing hoppers. Accordingly, when the n-bit binary counter 5a has counted $2^n-1$ timing pulses TP, a total of $2^n-1$ different bit patterns, from 000 ... 001 to 111 ... 111, will have been generated. Therefore, if a correlation is established between the first bit and the first weighing machine, between the second bit and the second weighing machine, and between third through n-th bits and the third through n-th weighing machines, respectively, then the generated bit pattern will be an indication of the above-mentioned combination pattern.

The generated bit pattern, indicated of the value of the count in counter 5a, is applied to a multiplexer 5b. The latter provides an arithmetic circuit 5f with weight values from the weight sensors 2e of those weighing machines specified by the bit pattern. For instance, if the value of the count is 1000101011 when n=10, then the arithmetic circuit 5f will receive the weight value outputs W1, W2, W3, W4, W6, W10 from the weight sensors 2e attached to the first, second, fourth, sixth and tenth weighing machines. The arithmetic circuit 5f also receives a signal $W_a$, indicative of a target value, from a target weight register 5c which stores the target weight. Numerals 5d and 5e denote upper and lower limit setting devices, respectively, for storing preset allowable limits (namely an upper limit or maximum value Ma, and a lower limit or minimum value Mi, respectively) for weight values. The minimum value Mi is set equal to the target value, as is customary. If it were set lower than the target value, the result could be delivery of articles having a total weight less than that intended, and complaints may ensue.

The arithmetic circuit 5f computes, and delivers a signal indicative of, the gross weight $\Sigma W_i(=X)$ of the weight values received from the multiplexer, and also computes the difference between the gross weight $\Sigma W_i$ and the target value $W_a$. The arithmetic circuit 5f produces a signal A indicating the absolute value of the computed difference. More specifically, circuit 5f performs the operations:

$$\Sigma W_i = X \tag{1}$$

$$|\Sigma W_i - W_a| = A \tag{2}$$

and produces a signal representing the total weight $\Sigma W_i(=X)$, as well as a signal representing the absolute value (hereafter referred to simply as the "deviation") of the difference between the gross weight $\Sigma W_i$ and the set target $W_a$. The value X is applied to a comparator 5g, whose output is connected to a counter 5h. The comparator 5g discriminates whether the gross weight X lies in the range defined by $M_i$ and $M_a$. Specifically, if the following relation holds:

$$M_i \leq X \leq M_a \tag{3}$$

then the comparator 5g will increment (count up) the counter 5h by one. A minimum deviation register 5j for storing the minimum deviation is set automatically to the deviation A the first time only, and thereafter is updated as the conditions warrant, as will be described later. A best combination memory 5k is adapted to store the best combination pattern. Numeral 5m and 5n denote gates. When the gross weight $\Sigma W_i$ is within the preset allowable limits, a comparator 5p compares the deviation value A, namely the output of the arithmetic circuit 5f, with the minimum deviation value, denoted by B, stored in the minimum deviation register 5j. When the inequality A<B holds, the output of comparator 5p is such that the deviation value A is delivered for storage to the minimum deviation register 5j through gate 5m, and the content (combination pattern) of counter 5a is delivered for storage to the best combination memory 5k.

Numeral 6 denotes a drive control unit. When the content of counter 5h is one or more, the drive control unit 6, which receives a signal from memory 5k indicative of the best combination pattern, is operable to open the weighing hopper gates 2f (FIG. 1) specified by the best combination pattern, so that the corresponding weighing hoppers 2d discharge their articles into the collecting chute 3, and to open the corresponding pool hopper gates 2c so that the emptied weighing hoppers 2d may be replenished with articles.

The operation of the foregoing system will now be described briefly. At the beginning, each of the pool hoppers 2b and weighing hoppers 2d contain a supply of the articles. The weight sensors 2e associated with the respective weighing machines measure the weights of the articles and produce the weight values W1 through W10 which are sent to the combination computing unit 5. The n-bit counter 5a (n=10) counts the timing pulses TP having the predetermined period to produce $2^n-1$ combination patterns. Thus, when the first timing pulse TP arrives and is counted, the content of counter 5a becomes 0000000001. As a result, the multiplexer 5b sends the first weight value signal W1 from the first weighing machine to the arithmetic circuit 5f, which responds by performing the operations specified by equations (1) and (2) above, thereby producing the signals indicative of the gross weight $\Sigma W_i$ of the combination and of the deviation $A(=|W1-W_a|)$ between $\Sigma W_i$ and the set target value $W_a$. Since the gates 5n, 5m are opened automatically for the initial combinatorial computation, the deviation value A is transferred to and stored in the minimum deviation register 5j, and the content (the combination pattern 0000000001) of n-bit counter 5a is stored in the best combination memory 5k. Comparator 5g compares the groww weight $\Sigma W_i(=X)$ against the maximum value $M_a$ and the minimum value $M_i$, and increments the counter 5h when the relation $M_i \leq X \leq M_a$ holds. Thenceforth, when the second timing pulse TP is generated, the pulse is counted by counter 5a, whose content (combination pattern) is incremented to 0000000010. Consequently, the weight value output W2 of the weight sensor 2e provided on the second weighing hopper is delivered to the arithmetic circuit 5f, which performs the operations of equations (1) and (2) to produce the signals indicative of the gross weight $\Sigma W_i(=X)$ and of the deviation value $A(=|W2-W_a|)$. The comparator 5g then determines whether equation (3) is satisfied; if it is, then the content of counter 5h is incremented by one. The comparator 5p, meanwhile, compares the deviation value A with the content $B(=|W1-W_a|)$ of the minimum deviation register 5j. If the relation $A \geq B$ holds, then neither the register 5j nor the best combination memory 5k is updated; if $A < B$ holds, the deviation value A is transferred to and stored in register 5j, and the content of counter 5a is transferred to and stored in memory 5k. The operation described above is repeated until all $2^n-1$ combinations have been generated. At such time the content of the minimum deviation register 5j will be the minimum deviation value obtained from the $2^n-1$ combinations, and the content of the best combination memory 5k will be the combination pattern that gave the minimum value. The best combination is thus selected from the total of $2^n-1$ possible combination patterns. Thenceforth the value of the count in counter 5h and the combination pattern stored in the best combination memory 5k are applied to the drive control unit 6. When the value of the count in counter 5h is one or more, the drive control unit 6 opens the hopper gates 2f specified by the input combination pattern. The corresponding weighing hoppers 2d of the weighing machines that give the best combination therefore discharge their articles into the collecting chute 3, after which the drive control unit 6 opens the corresponding pool hopper gates 2c to replenish the emptied weighing hoppers 2d with articles. Further, the dispersing feeders 2a corresponding to the now-empty pool hoppers, are vibrated for a fixed length of time to resupply these pool hoppers with articles. This completes one combinatorial weighing cycle, which may be repeated as often as required, to provide batches of the articles, each batch having a total weight equal to or closest to the set target weight. When the content of counter 5h is zero in the foregoing operation, articles are not discharged and each of the weighing machines must be supplemented with articles to resume the combinatorial computations.

Figure 3:
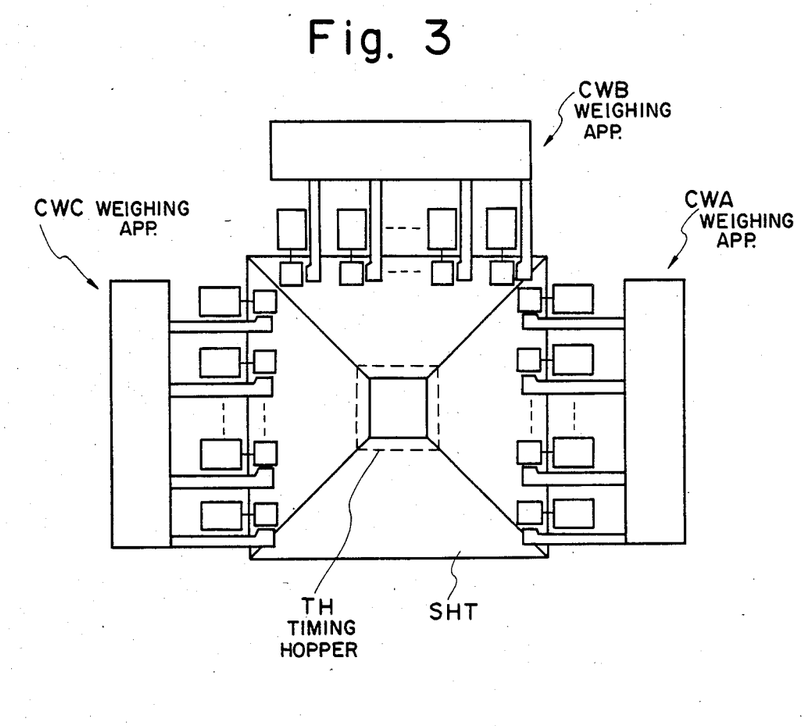
FIG. 3 is a schematic diagram of a combinatorial weighing apparatus in accordance with the present invention for practicing the method of the present invention.

Reference will now be had to FIG. 3 illustrating a combinatorial weighing system to which the present invention may be applied. The apparatus includes first, second and third weighing apparatus CWA, CWB, CWC for weighing three (in this embodiment) different varieties of articles AA, BA, CA, a chute SHT for collecting the articles discharged from the first, second and third weighing apparatus CWA, CWB, CWC, and a timing hopper TH for temporarily holding the collected articles. The timing hopper responds to an externally applied signal from a packaging machine or the like by discharging the retained articles from the system. Each weighing apparatus CWA, CWB, CWC has the construction shown in FIG. 1, with the exception of the collecting chute 3 and timing hopper 4.

Figure 4:
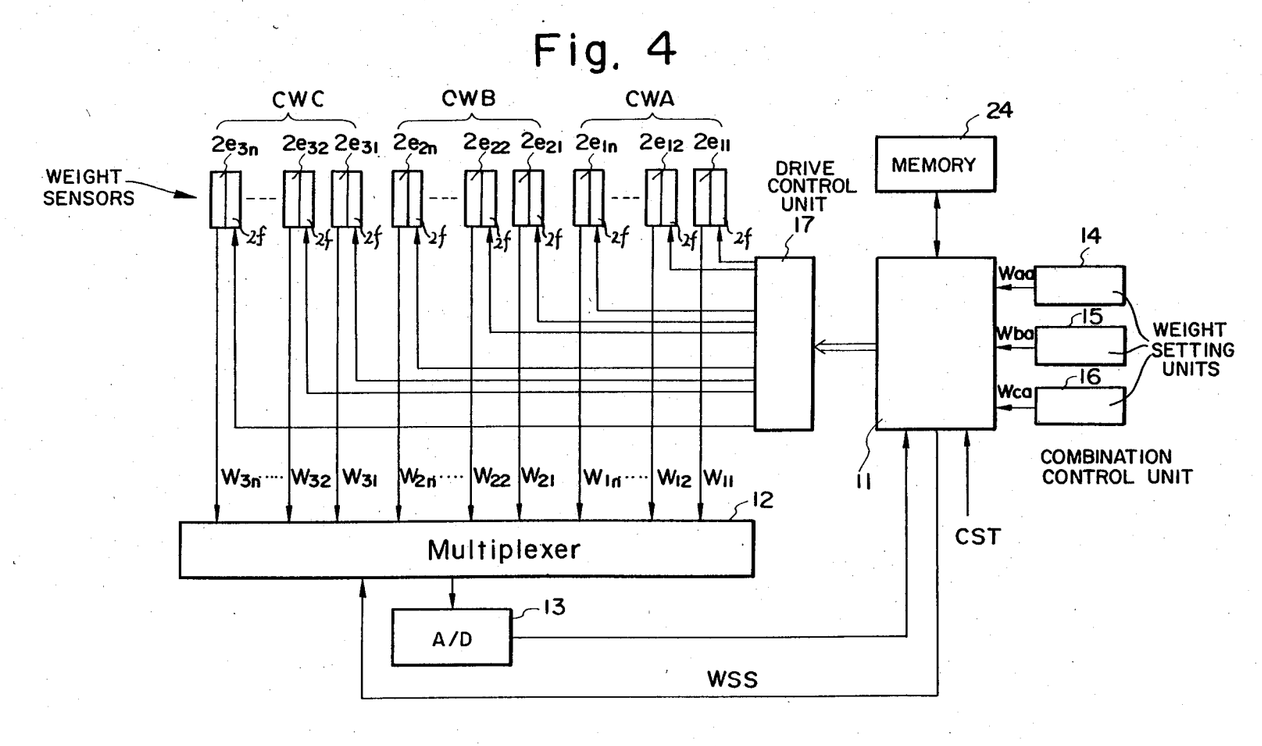
FIGS. 4, 5 and 6 are block diagrams of apparatus in accordance with the present invention; for practicing the method of the present invention.

A block diagram of the circuitry for realizing the system of FIG. 3 is illustrated in FIG. 4. A combination control unit 11, constituted by a microcomputer or the like, is adapted to store weight values W11, W12, ... W1n, W21, W22, ... W2n, W31, W32, ... W3n provided by weight sensors $2e_{11}$, $2e_{12}$, ... $2e_{1n}$ of weighing apparatus CWA, by weight sensors $2e_{21}$, $2e_{22}$, ... $2e_{2n}$ of weighing apparatus CWB, and by weight sensors $2e_{31}$, $2e_{32}$, ... $2e_{3n}$ of weighing apparatus CWC, respectively, to find the best combination for each category of articles by computing combinations of the articles in each category in the same fashion as described in connection with FIG. 1, and to store the best combination. A multiplexer 12, which receives a selection signal WSS produced by the control unit 11, provides an analog-to-digital converter 13 (hereafter referred to as a A/D converter) 13 successively with selected ones of the weight values $W_{ij}$ (i=1,2,3; j=1,2, ... n) from the weight sensors $2e_{ij}$, these weight values being selected by the multiplexer on the basis of the selection signal WSS. The A/D converter 13 converts the analog weight value $W_{ij}$ obtained via the multiplexer 12 into a digital value and a signal indicative of this value is sent to the combination control unit 11 where the digital value is stored in an internal memory. When the weight signals from all of the weight sensors in the weighing apparatus CWA, CWB, CWC have been stored in the combination control unit 11, the latter computes combinations on the basis of target values set in weight setting units 14, 15, 16. Specifically, weight setting unit 14 stores a target weight value $W_{aa}$ for the articles AA, weight setting unit 15 a target weight value $W_{ba}$ for the articles BA, and weight setting unit 16 a target weight value $W_{ca}$ for the articles CA.

In operation, the articles AA, BA, CA are fed into each of the corresponding weighing hoppers $2d$ and pool hoppers $2b$ of each weighing apparatus CWA, CWB, CWC, respectively. When a packaging machine (not shown) is ready to begin packaging articles, a start signal CST is applied to the combination control unit 11. The control unit 11 responds to the start signal CST by applying the selection signal WSS to the multiplexer 12. When the signal WSS arrives, the multiplexer 12 responds by first successively providing the A/D converter 13 with the output weight values W11, W12, ... W1n of the weight sensors $2e_{11}, 2e_{12}, \ldots 2e_{1n}$ that are weighing the articles AA in apparatus CWA. The A/D converter 13 successively converts the weight values W11, W12, ... W1n into digital values and applies these values to the combination control unit 11 where they are stored in the unit's internal memory. When the weight values W11, W12, ... W1n from all of the weight sensors $2e_{11}, 2e_{12}, \ldots 2e_{1n}$ belonging to the first weighing apparatus CWA have been stored in the combination control unit 11, the latter computes combinations, as described above with reference to FIG. 1, on the basis of the target value $W_{aa}$ set in setting unit 14. The control unit 11 then finds the best combination resulting from the combinatorial computation and stores, in a best combination memory 24, the bit pattern (best combination pattern) corresponding to said best combination.

When the best combination for the articles AA has been found by the combinatorial computations performed for those articles, processing shifts to combinatorial computations performed for the articles BA. That is, the combination control unit 11 produces the selection signal WSS and successively reads in the output weight values W21, W22, ... W2n from the weight sensors $2e_{21}, 2e_{22}, \ldots 2e_{2n}$ that are weighing the articles BA. Thenceforth, when the best combination of the articles BA is found by combinatorial computations just as described above, processing shifts to combinatorial computations performed for the articles CA.

When the combinatorial computations for the plurality of different articles AA, BA, CA end, the combination control unit 11 provides a drive control unit 17 with the best combination pattern for each of the article categories AA, BA, CA, these best combination patterns having been stored in the memory 24. The drive control unit 17 responds by opening the weighing hopper gates $2f$ of those weighing machines designated by the best combination pattern, whereby the contained articles are discharged into the collecting chute SHT (FIG. 3) and retained temporarily in the timing hopper TH. Thus, a batch made up of the articles in each category can be obtained, with the AA, BA, CA-category articles having the prescribed weights $W_{aa}, W_{ba}, W_{ca}$, respectively.

In the foregoing, the target weights for the articles in each category were set in the setting units 14, 15, 16. It is also possible, however, to set the weight ratios of the articles AA, BA, CA and set the gross target weight of a batch separately, and then find the target weight value of the articles in each category from the weight ratio and gross target weight.

In the embodiment described and illustrated above, target weights were set for the articles in each category. Substantially the same method may be followed to set numbers for these articles rather than weights. The method for setting article numbers differs in three points: (a) target numbers $N_{aa}, N_{ba}, N_{ca}$ are set rather than the target weights $W_{aa}, W_{ba}, W_{ca}$; (b) the unit weights $W_{ua}, W_{ub}, W_{uc}$ of the articles AA, BA, CA are set; and (c) the number of articles is found from the weight value and the unit weight. An embodiment in which target numbers are set will now be described with reference to FIG. 5.

Figure 5:
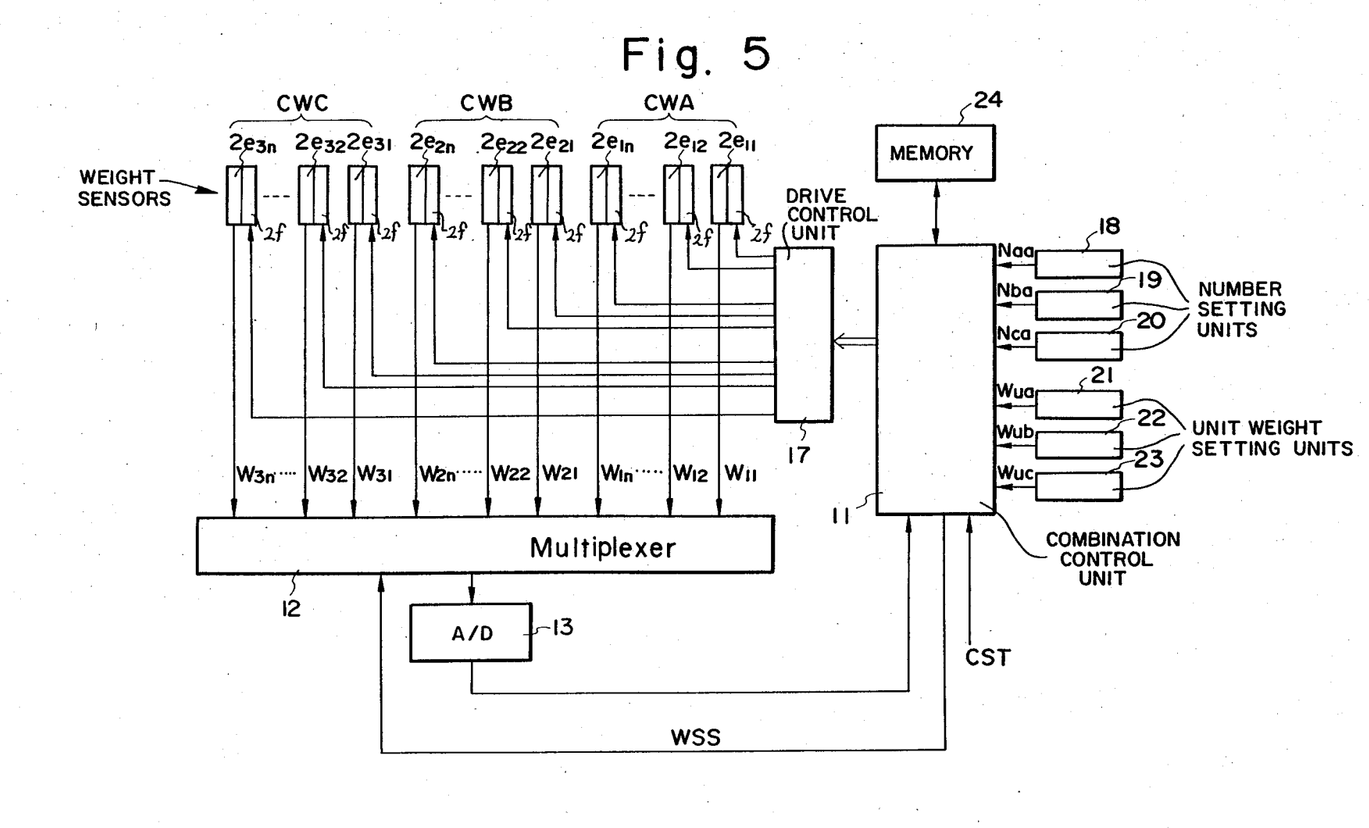

In FIG. 5, number setting units 18 through 20 and unit weight setting units 21 through 23 are connected to the combination control unit 11. The target numbers $N_{aa}, N_{ba}, N_{ca}$ of the articles AA, BA, CA are set in the setting units 18 through 20, and the unit weights $W_{ua}, W_{ub}, W_{uc}$ (the weight of each individual article) are set in the setting units 21 through 23. The control unit 11 computes the numbers of articles $n_{11}, n_{12}, \ldots n_{1n}$ for the category AA by dividing the weight values, obtained from the weight sensors $2e_{11}, 2e_{12}, \ldots 2e_{1n}$, by the unit weight $W_{ua}$, computes the numbers of articles $n_{21}, n_{22}, \ldots n_{2n}$ for the category BA by dividing the weight values, obtained from the weight sensors $2e_{21}, 2e_{22}, \ldots 2e_{2n}$, by the unit weight $W_{ub}$, computes the numbers of articles $n_{31}, n_{32}, \ldots n_{3n}$ for the category CA by dividing the weight values, obtained from the weight sensors $2e_{31}, 2e_{32}, \ldots 2e_{3n}$, by the unit weight $W_{uc}$, and computes combinations for each category of articles on the basis of the number of articles and the target numbers.

In operation, the articles AA, BA, CA are fed into each of the corresponding weighing hoppers $2d$ and pool hoppers $2b$ of each weighing apparatus CWA, CWB, CWC, respectively. When a packaging machine (not shown) is ready to begin packaging articles, a start signal CST is applied to the combination control unit 11. The control unit 11 responds to the start signal CST by applying the selection signal WSS to the multiplexer 12. When the signal WSS arrives, the multiplexer 12 responds by first successively providing the A/D converter 13 with the output weight values W11, W12, ... W1n of the weight sensors $2e_{11}, 2e_{12}, \ldots 2e_{1n}$ that are weighing the articles AA in apparatus CWA. The A/D converter 13 successively converts the weight values W11, W12, ... W1n into digital values and applies these values to the combination control unit 11. The control unit 11 divides the weight values W11, W12, ... W1n by the unit weight $W_{ua}$ set for the articles AA to compute the numbers of articles $n_{11}, n_{12}, \ldots n_{1n}$, and stores the latter in a memory, not shown. The control unit 11 then computes the best combination that gives the number of articles equal to the target number $N_{aa}$ set in the target number setting unit 18, or closest to the target number $N_{aa}$ within the preset allowable limits. This best combination is stored in the best combination memory 24. Similar processing is executed with respect to the articles BA, CA, whereby the best combinations for these article categories are obtained. The combination control unit 11 then provides a drive control unit 17 with the best combination pattern for each of the article categories AA, BA, CA, these best combination patterns havinb been stored in the memory 24. The drive control unit 17 responds by opening the weighing hopper gates $2f$ of those weighing machines designated by the best combination patterns, whereby the contained articles are discharged into the collecting chute SHT (FIG. 3) and retained temporarily in the timing hopper TH. Thus, a batch made up of the articles in each category can be obtained, with the AA, BA, CA-category articles having the prescribed numbers of articles $N_{aa}, N_{ba}, N_{ca}$, respectively.

In the foregoing, the target numbers for the articles in each category were set in the setting units 18, 19, 20. It is also possible, however, to set the number ratios of the articles AA, BA, CA and set the overall target number for all the articles, and then find the target numbers $N_{aa}$, $N_{ba}$, $N_{ca}$ of each of the articles in each category from the number ratio and overall target number.

Described next with reference to FIG. 6 will be a method through which a target number is set for each of a plurality of article categories, with a batch being obtained wherein the number of articles in each category is the target number set for that category and the total weight of all the articles in the batch is that closest to a target weight.

Figure 6:
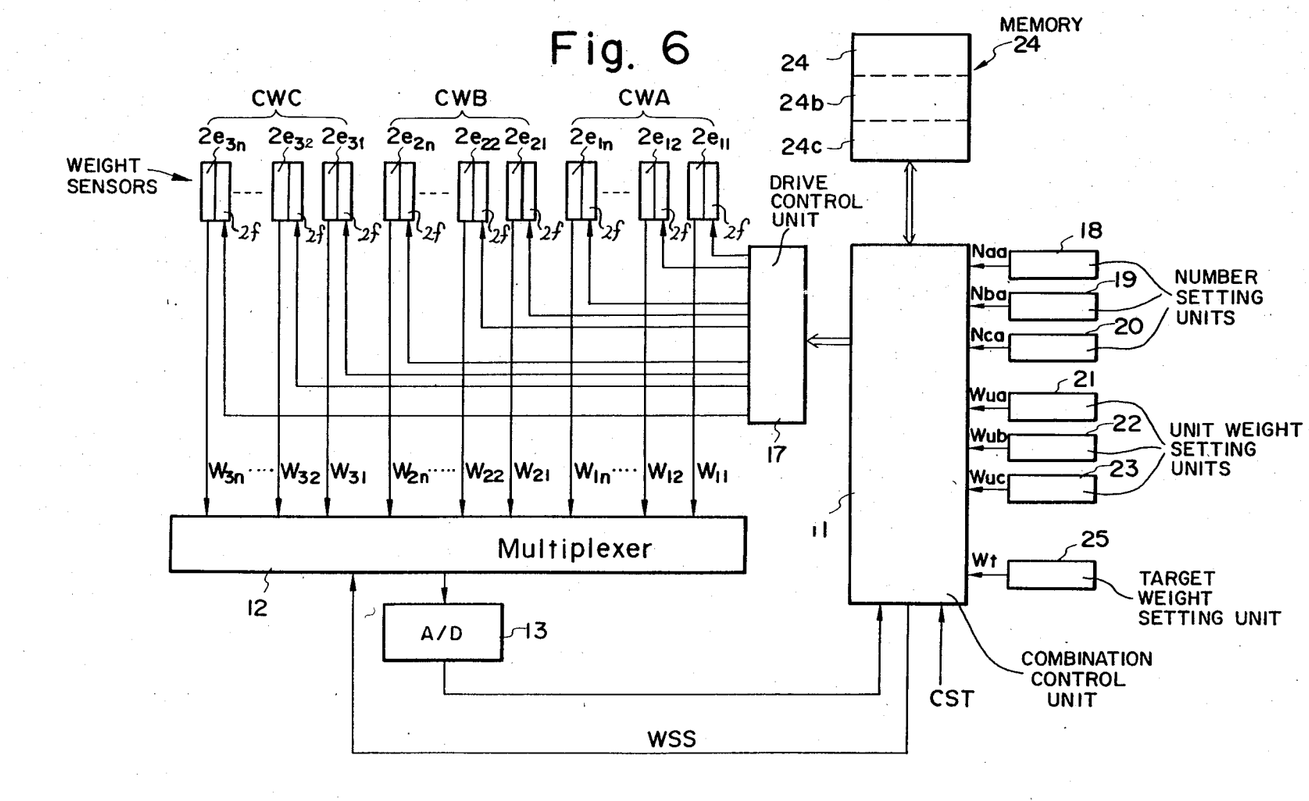

In FIG. 6, the memory 24 has best combination pattern storage areas 24a, 24b, 24c for storing the best combination patterns for each of the article categories AA, BA, CA. The combination control unit 11 is adapted to find the best combination that gives a number of articles, of category AA, equal to the target number $N_{aa}$ or closest to the target number within the preset allowable limits, and to store the best combination pattern in the best combination storage area 24a. In a case where the best combination is not limited to a single one but to several, all of these best combination patterns are stored in the storage area 24a. The combination control unit 11 is further adapted to find the best combinations that give number of articles, of categories BA, CA, equal to the respective target numbers $N_{ba}$, $N_{ca}$ or closest to these target numbers within the preset allowable limits, and to store the best combination patterns in the best combination storage areas 24b, 24c. A target weight setting unit 25 is connected to the control unit 11 and sets the total target weight Wt for all of the articles. That is, the target weight Wt will be the weight set for an entire batch. When the control unit 11 has computed the best combinations corresponding to the article groups AA, BA, CA and has stored these best combinations in the best combination pattern storage areas 24a, 24b, 24c, the control unit proceeds to execute the following processing with respect to all of the best combinations, selected from one after another of each of the storage areas 14a, 24b, 24c.

In a case where a-, b- and c-sets of best combination patterns have been stored in the respective combination pattern storage areas 24a, 24b, 24c, there will be a total of M combinations of the best combination patterns, these being selected from one after another of the storage areas. M is expressed by $M = a \times b \times c$. Accordingly, the combination control unit 11 finds, from the total of M combinations, the combination whose combined weight value is equal or closest to the target weight Wt for the batch set in target weight setting unit 25.

In operation, the articles AA, BA, CA are fed into each of the corresponding weighing hoppers 2d and pool hoppers 2b of each weighing apparatus CWA, CWB, CWC, respectively. When a packaging machine (not shown) is ready to begin packaging articles, a start signal CST is applied to the combination control unit 11. The control unit 11 responds to the start signal CST by applying the selection signal WSS to the multiplexer 12. When the signal WSS arrives, the multiplexer 12 responds by first successively providing the A/D converter 13 with the output weight values W11, W12, ... W1n of the weight sensors $2e_{11}$, $2e_{12}$, ... $2e_{1n}$ that are weighing the articles AA in apparatus CWA. The A/D converter 13 successively converts the weight values W11, W12, ... W1n into digital values and applies these values to the combination control unit 11. The control unit 11 divides the weight values W11, W12, ... W1n by the unit weight $W_{ua}$ set for the articles AA to compute the numbers of articles $n_{11}$, $n_{12}$, ... $n_{1n}$, and stores the latter in a memory (not shown). The control unit 11 then computes the best combination that gives the number of articles equal to the target number $N_{aa}$ set in the target number setting unit 18, or closest to the target number $N_{aa}$ within the preset allowable limits. This best combination is stored in the combination pattern storage area 24a. It should be noted that there may be several best combinations, and not just one. Similar processing is executed with respect to the articles BA, CA, whereby the best combinations for these articles categories are obtained and stored in the respective combination pattern storage areas 24b, 24c. Next, the combination control unit 11 is operable to select, from among all of the combinations of best combination patterns chosen from one after another of the storage areas 24a, 24b, 24c, that combination whose total weight is equal or closest to the target weight Wt set in the target weight setting unit 25. The control unit 11 thenceforth opens the weighing hopper gates of the weighing machines corresponding to the combination whose total weight is equal or closest to the target weight Wt, thereby releasing the corresponding articles into the collecting chute SHT where they are retained temporarily by the timing hopper TH. Thus, a batch composed of the articles in each category can be obtained, with the AA, BA, CA-category articles having the prescribed numbers of articles $N_{aa}$, $N_{ba}$, $N_{ca}$, respectively, and with the total weight of all articles in the batch being that which is equal or closest to the target weight Wt.

Described next will be a combinatorial weighing method including the steps of setting a target number for each of a plurality of article categories, and obtaining a batch of the articles wherein the total number of articles of each category in the batch is that which is equal to the target number set for that category, or that which is closest to the target number within preset allowable limits, while the total weight of all the articles in the batch is that which is closest to a target weight, wherein when no combination of the articles of a certain article category is found that gives a value equal to the target number or closest to the target number within the preset allowable limits, the target number for each of the articles is revised. In other words, in the case to be described now, we shall assume that, for a certain article category, no combination can be found that gives a value equal to the target number or closest to the target number within the preset allowable limits. When such a case arises, the target number for each of the articles is revised in accordance with the inventive method. The method can be practiced by means of the arrangement shown in FIG. 6 without alteration, the only difference being the processing executed by the combination control unit 11. The change in processing can be effected merely by changing the program of the microcomputer constituting the control unit 11.

The combination control unit 11 is constantly checking for the arrival of the start signal CST, produced when the packaging machine (not shown) is ready. At the instant the signal CST arrives, the combination control unit 11 sends the selection signal WSS to the multiplexer 12. When the signal WSS arrives, the multiplexer 12 responds by first successively providing the A/D converter 13 with the output weight values W11, W12, ... W1n of the weight sensors $2e_{11}$, $2e_{12}$, ... $2e_{1n}$ that are weighing the articles AA in the first weighing apparatus CWA. The A/D converter 13 successively converts the weight values W11, W12, ... W1n into digital values which are read in and stored by the combination control unit 11. The control unit 11 divides the weight values W11, W12, ... W1n by the unit weight $W_{ua}$ set for the articles AA to compute and store the numbers of articles $n_{11}, n_{12}, \ldots n_{1n}$. The control unit 11 then computes the best combination that gives the number of articles equal to the target number $N_{aa}$ set in the target number setting unit 18, or closest to the target number $N_{aa}$ within the preset allowable limits. This best combination is stored in the combination pattern storage area 24a. Similar processing is executed with respect to the articles BA, CA in order to obtain the combinations that give numbers coinciding with the target numbers $N_{ba}$, $N_{ca}$, or numbers closest to them within the preset allowable limits.

Assume now that for a certain category of the articles, say articles AA, no combination can be found that gives a number of articles equal to the target number $N_{aa}$ or closest to the target number within the preset allowable limits. In such case the combination control unit 11 executes processing to revise the target number. Specifically, in order to change the target number $N_{aa}$ for the articles AA without changing the overall number of articles when the articles AA, BA, CA are collected together in a batch, the target number for one of the other categories, say the articles BA, is changed compulsorily (the target number $N_{ca}$ for the other articles CA is left unaltered). When this has been accomplished, the control unit 11 computes the best combinations based on the revised target numbers $N_{aa'}$ and $N_{ba'}$, and on $N_{ca}$. These best combinations are stored in the combination pattern storage areas 24a, 24b, 24c. The control unit 11 then selects, from among all combinations of the best combination patterns chosen from one after another of the storage areas 24a, 24b, 24c, that combination whose total weight value is equal or closest to the target weight Wt set by the target weight setting unit 25. This will end the revising process. Thereafter, the control unit 11 opens the weighing hopper gates belonging to the weighing machines that correspond to the combination (of best combination patterns) whose total weight is equal or closest to the target weight, thereby discharging the corresponding articles to provide the prescribed batch.

In the foregoing, the unit weights of the articles AA, BA, CA are approximately the same and there is little variance in each unit weight. In a case where the unit weights do differ and there is variance, however, the control unit 11, while holding the overall number of articles constant when the articles are collected together in a batch, is operable to change the target number $N_{aa}$ for the articles AA and, as described above, to change the target number $N_{ba}$ for the articles BA or the target number $N_{ca}$ for the articles CA. Then, in either case, the revision process is executed as set forth above.

In a case where combinations cannot be found giving values coinciding with the target numbers $N_{aa}$, $N_{ba}$ for the articles AA, BA, by way of example, the control unit 11 changes these target values $N_{aa}$, $N_{ba}$ and then executes the processing for computing combinations. In this case, the target values for the articles AA, BA are changed but not the target value $N_{ca}$ for the articles CA, while holding constant the overall number of articles when they are collected together. If combinations cannot be found giving values coinciding with any of the target numbers $N_{aa}$, $N_{ba}$, $N_{ca}$ for the articles AA, BA, CA, then the control unit 11 compulsorily changes these target numbers $N_{aa}$, $N_{ba}$, $N_{ca}$ to predetermined fixed values $N_{aa'}$, $N_{ba'}$, $N_{ca'}$ (without changing the overall number of articles) to execute the revision process.

In accordance with the present invention as described and illustrated hereinabove, it is possible to quickly obtain a batch of articles of a plurality of categories wherein each category of articles exhibits a predetermined weight or is composed of a predetermined number of the articles. It is possible also to bring the weight of all the articles or the number thereof into agreement with a target value or very close to the target value within preset allowable limits. Moreover, the invention quickly provides a batch of articles of various categories, with each category having a predetermined number of articles, while the total weight of all the articles in the batch is equal to a target weight or closest to the target weight within preset allowable limits.

The present invention does not require that bulky articles of various kinds be mixed together in advance, thereby enabling the apparatus to be reduced in size. Further, in a case where a combination cannot be found that satisfies a given target number for a certain category of articles, this particular target number, as well as the target number for at least one other category of articles, is altered while holding the overall number of articles constant. Then, combinations are computed afresh on the basis of these altered target numbers. This means that it will not be necessary to halt the weighing operation because a combination cannot be found.

Although a certain preferred embodiment has been shown and described in detail, it should be understood that many changes and modifications may be made therein without departing from the scope of the appended claims.

What we claim is:

1. A combinatorial measuring method for obtaining a collection of articles from N categories, where N is an integer greater than one, said method comprising the steps of:
   (a) supplying N groups of article quantity values, each of said N groups of article quantity values being provided for a corresponding one of the N categories of articles, each of the article quantity values within a group corresponding to the actual quantity of a batch of articles within the corresponding one of the N categories;
   (b) performing the following step for each of M categories of articles, where M is an integer and M equals N−1:
      (b1) selecting, for a Jth category of articles, where J is an integer between 1 and M, and from combinations of the Jth group of article quantity values provided for the Jth category of articles, a Jth combination having a total value which is within first preset allowable limits;
   (c) selecting, for the Nth category of articles, and from combinations of the Nth group of article quantity values provided for the Nth category of articles, an Nth combination having a total value which, when added to the total values of the M combinations selected in said step (b), yields a total collection value which is within second preset allowable limits; and
   (d) selecting the batches of articles within each of the N categories corresponding to the article quantity values which make up the M combinations and the Nth combination obtained for the N categories of articles, to form a collection of articles.

2. A combinatorial measuring method as set forth in claim 1, wherein:
   said combinatorial measuring method is a combinatorial weighing method;
   said step (a) comprises supplying N groups of article weight values, each of which corresponds to the actual weight of a batch of articles within the corresponding one of the N categories;
   said step (b) comprises selecting a Jth combination having a total weight value which is within first preset allowable limits; and
   said step (c) comprises selecting an Nth combination having a total weight value which, when added to the total weight values of the M combinations selected in said step (b), yields a total collection weight value which is within second preset allowable limits.

3. A combinatorial measuring method as set forth in claim 1, wherein:
   said step (a) comprises supplying N groups of article count values, each of the article count values within a group corresponding to the actual number of articles in a batch of articles within the corresponding one of the N categories;
   said step (b) comprises selecting, for each of the M categories of articles, a Jth combination having a total count value which is within first preset allowable limits; and
   said step (c) comprises selecting an Nth combination having a total count value which, when added to the total count values of the M combinations selected in said step (b), yields a total collection count value which is within second preset allowable limits.

4. A combinatorial measuring method for obtaining a collection of articles from first and second categories, said method comprising the steps of:
   (a) supplying first and second groups of article weight values, each of said first and second groups of article weight values being provided for a corresponding one of the first and second categories of articles, each of the article weight values within a group corresponding to the actual weight of a batch of articles within the corresponding one of the first and second categories;
   (b) selecting, for the first category of articles, and from combinations of the first group of article weight values provided for the first category of articles, a first combination having a total value which is within first preset allowable limits;
   (c) selecting, for the second category of articles and from combinations of the group of article weight values provided for the second category of articles, a second combination having a total value which, when added to the total value of the first combination selected in said step (b), yields a total collection value which is within second preset allowable limits; and
   (d) selecting the batches of articles within each of the first and second categories corresponding to the article weight values which make up the first and second combinations obtained for the first and second categories of articles, to form the collection of articles.

5. A combinatorial measuring method according to claim 4, wherein:
   said combinatorial measuring method is a combinatorial weighing method;
   said step (b) comprises selecting a first combination having a total weight value which is within first preset allowable limits; and
   said step (c) comprises selecting a second combination having a total weight value which, when added to the total weight value of the first combination selected in said step (b), yields a total collection weight value which is within second preset allowable limits.

6. A combinatorial counting method for obtaining a collection of articles from first and second categories, said method comprising the steps of:
   (a) supplying first and second groups of article count values, each of said first and second groups of article count values being provided for a corresponding one of the first and second categories of articles, each of the article count values within a group corresponding to the actual number of articles in a batch of articles within the corresponding one of the first and second categories;
   (b) selecting, for the first category of articles, and from combinations of the first group of article count values provided for the first category of articles, a first combination having a total count value which is within first preset allowable limits;
   (c) selecting, for the second category of articles and from combinations of the group of article count values provided for the second category of articles, a second combination having a total count value which, when added to the total count value of the first combination selected in said step (b), yields a total collection count value which is within second preset allowable limits; and
   (d) selecting the batches of articles within each of the first and second categories corresponding to the article count values which make up the first and second combinations obtained for the first and second categories of articles, to form the collection of articles.

7. A combinatorial measuring apparatus for obtaining a collection of articles of N categories, where N is an integer greater than one, the collection of articles having a total quantity which is within total preset allowable limits, said apparatus comprising:
   means for setting preset allowable limits for each of the categories of articles except fot the Nth category of articles;
   N groups of weighing machines for providing quantity values, each of said N groups of weighing machines being provided for a corresponding one of the N categories of articles;
   means, operatively connected to said setting means and said N groups of weighing machines, for obtaining N−1 combinations of quantity values for N−1 of the N categories of articles, each of the N−1 combinations being within the preset allowable limits for the corresponding category of articles defined by said setting means, and for obtaining an Nth combination of quantity values for the Nth category of articles such that the sum of the N−1 combinations of quantity values and the Nth combination of quantity values is within the total preset allowable limits; and
   means for discharging articles from the weighing machines corresponding to the N−1 combinations of quantity vlaues and the Nth combination of quantity values.

8. A combinatorial measuring apparatus as set forth in claim 7, wherein:
- said combinatorial measuring apparatus is a combinatorial weighing apparatus for obtaining a collection of articles having a total weight which is within the total preset allowable limits;
- said N groups of weighing machines provide N groups of weight values; and
- said obtaining means obtains N−1 combinations of weight values for the corresponding N−1 categories of articles and obtains an Nth combination of weight values for the Nth category of articles.

9. A combinatorial measuring apparatus as set forth in claim 7, wherein:
- said combinatorial measuring apparatus is a combinatorial counting apparatus for obtaining a collection of articles having a total count which is within the total preset allowable limits;
- said N groups of weighing machines provide N groups of weight values;
- said obtaining means includes means for converting the N groups of weight values into N groups of count values; and
- said obtaining means obtains N−1 combinations of count values for the corresponding N−1 categories of articles and obtains an Nth combination of count values for the Nth category of articles.

10. A combinatorial weighing apparatus for obtaining a collection of articles of first and second categories, the collection of articles having a total weight which is within first preset allowable limits, said apparatus comprising:
- means for setting second preset allowable limits for the first category of articles;
- first and second groups of weighing machines for providing weight values, each of said first and second groups of weighing machines being provided for a corresponding one of the first and second categories of articles;
- means, operatively connected to said setting means and said first and second groups of weighing machines, for obtaining a first combination of weight values for the first category of articles which is within the second preset allowable limits, and for obtaining a second combination of weight values for the second category of articles, such that the sum of the first and second combinations of weight values from the first and second groups of weighing machines is within the first preset allowable limits; and
- means for discharging articles from the weighing machines corresponding to the first and second combinations of weight values.

11. A combinatorial counting apparatus for obtaining a collectiion of articles of first and second categories, the collection of articles having a total count which is within first preset allowable limits, said apparatus comprising:
- means for setting second preset allowable limits for the first category of articles;
- first and second groups of weighing machines for providing weight values, each of said first and second groups of weighing machines being provided for a corresponding one of the first and second categories of articles;
- means, operatively connected to said setting means and said first and second groups of weighing machines, for converting the weight values to corresponding count values, for obtaining a first combination of count values for the first category of articles which is within the second preset allowable limits, and for obtaining a second combination of count values for the second category of articles, such that the sum of the first and second combinations of count values for the first and second categories of articles is within the first preset allowable limits; and
- means for discharging articles from the weighing machines corresponding to the first and second combinations of count values.

* * * * *

UNITED STATES PATENT AND TRADEMARK OFFICE
CERTIFICATE OF CORRECTION

PATENT NO. : 4,658,920

DATED : APRIL 21, 1987

INVENTOR(S) : SEISHI MATSUMOTO ET AL.

It is certified that error appears in the above-identified patent and that said Letters Patent is hereby corrected as shown below:

Col. 5, line 35, "groww" should be --gross--.

Col. 8, line 57, "havinb" should be --having--.

Col. 9, line 41, "14a" should be --24a--.

Signed and Sealed this

Twentieth Day of October, 1987

Attest:

DONALD J. QUIGG

Attesting Officer

Commissioner of Patents and Trademarks